(12) United States Patent
Chang

(10) Patent No.: US 8,763,560 B2
(45) Date of Patent: Jul. 1, 2014

(54) FOLDABLE AND PORTABLE SHELTER

(71) Applicant: Jui-Yang Chang, Taichung (TW)

(72) Inventor: Jui-Yang Chang, Taichung (TW)

( * ) Notice: Subject to any disclaimer, the term of this patent is extended or adjusted under 35 U.S.C. 154(b) by 0 days.

(21) Appl. No.: 13/662,599

(22) Filed: Oct. 29, 2012

(65) Prior Publication Data

US 2014/0116349 A1    May 1, 2014

Related U.S. Application Data

(63) Continuation-in-part of application No. 12/802,986, filed on Jun. 17, 2010, now abandoned.

(51) Int. Cl.
*A01K 1/03*    (2006.01)
*A01K 1/02*    (2006.01)

(52) U.S. Cl.
CPC ............. *A01K 1/0254* (2013.01); *A01K 1/029* (2013.01)
USPC ............................ 119/497; 119/498; 119/500

(58) Field of Classification Search
USPC .................................................. 119/496–500
See application file for complete search history.

(56) References Cited

U.S. PATENT DOCUMENTS

| | | | |
|---|---|---|---|
| 2,538,778 A | 1/1951 | Halpin | 119/497 |
| 3,144,852 A | 8/1964 | Messeas | |
| 3,195,506 A | 7/1965 | Beard | 119/496 |
| 3,866,577 A | 2/1975 | Mathis | |
| 4,006,713 A | 2/1977 | Hawley, III | |
| 4,256,056 A | 3/1981 | Sou | |
| 4,334,501 A | 6/1982 | McDaniel et al. | |
| 4,484,540 A * | 11/1984 | Yamamoto | 119/497 |
| 4,803,952 A | 2/1989 | Houser | |
| 5,154,137 A * | 10/1992 | Stanaland | 119/496 |
| 5,357,900 A * | 10/1994 | Ho | 119/479 |
| 5,467,734 A * | 11/1995 | Ho | 119/497 |
| 5,967,090 A | 10/1999 | Hui | 119/497 |
| 6,863,030 B2 | 3/2005 | Axelrod | 119/498 |
| 7,201,116 B2 * | 4/2007 | Axelrod | 119/496 |
| 7,347,164 B2 | 3/2008 | Axelrod et al. | 119/499 |
| 8,127,719 B2 | 3/2012 | Jakubowski et al. | 119/499 |
| 8,413,472 B2 * | 4/2013 | Chiang | 70/63 |
| 2001/0045190 A1 | 11/2001 | Pivonka et al. | 119/498 |
| 2002/0092477 A1 * | 7/2002 | Ross | 119/496 |
| 2003/0127060 A1 | 7/2003 | Yeung | 119/497 |
| 2003/0192483 A1 * | 10/2003 | Saxe et al. | 119/498 |
| 2004/0134444 A1 | 7/2004 | Shiever et al. | 119/496 |
| 2008/0121188 A1 | 5/2008 | Axelrod et al. | 119/499 |
| 2010/0192870 A1 * | 8/2010 | Wood | 119/496 |
| 2011/0041774 A1 | 2/2011 | Northrop et al. | 119/497 |

FOREIGN PATENT DOCUMENTS

| | | | | | |
|---|---|---|---|---|---|
| GB | 2339132 A | * | 1/2000 | | A01K 1/02 |
| JP | 2006305995 A | * | 11/2006 | | B31F 1/24 |

* cited by examiner

*Primary Examiner* — Son T Nguyen
*Assistant Examiner* — Kathleen Alker
(74) *Attorney, Agent, or Firm* — Alan Kamrath; Kamrath IP Lawfirm, P.A.

(57) ABSTRACT

A foldable and portable shelter includes a base member and an upper member combined with the base member. The base member includes a bottom wall panel, a rear wall panel, and a front wall panel. Each of the rear wall panel and the front wall panel has a periphery provided with multiple first reinforcing ribs each having an arcuate concave surface. The upper member includes a top wall panel and two opposed side wall panels. Each of the top wall panel and the side wall panels has a periphery provided with multiple second reinforcing ribs each having an arcuate concave surface. Each of the second reinforcing ribs overlaps the respective first reinforcing rib so that the second reinforcing ribs cooperate with the first reinforcing ribs to reinforce the strength of the upper member and the base member.

4 Claims, 9 Drawing Sheets

FOLDABLE AND PORTABLE SHELTER

CROSS-REFERENCES TO RELATED APPLICATIONS

The present invention is a continuation-in-part application of the co-pending U.S. Ser. No. 12/802,986, filed on Jun. 17, 2010.

BACKGROUND OF THE INVENTION

1. Field of the Invention

The present invention relates to a shelter (carrier, box, cage or the like) and, more particularly, to a foldable and portable shelter for carrying and storing pets.

2. Description of the Related Art

Typical foldable and portable shelters comprise a number of wall members or panels, such as a bottom wall, two opposed end walls, two side walls, and a roof member, that are required to be assembled together.

For example, U.S. Pat. No. 3,144,852 to Messeas discloses one of the typical portable knock-down animal housing structures including opposed end walls and side walls interrelated by tie rod members and lock nuts, for supporting a bottom wall, and a roof member shaped and dimensioned to define a shallow receptacle when the housing structure is disassembled to receive the wall members. However, it will be complicated to manufacture and assemble the opposed end walls and the side walls and the bottom wall and the roof member together, and it will be difficult to engage tie rod members into and through the wall members, such that the manufacturing and assembling time may be greatly increased.

U.S. Pat. No. 3,866,577 to Mathis discloses another typical prefabricated animal housing comprising side walls having spaced corner lugs at the end thereof which interconnect with front and rear walls which also include spaced corner lugs at the end thereof, and a floor and roof mounted with the side walls and the front and rear walls with lock pins. However, similarly, it will be complicated to manufacture and assemble the side walls and the front and rear walls and the floor wall and the roof member together, and it will be difficult to engage tie lock pins into and through the wall members, such that the manufacturing and assembling time may be greatly increased.

U.S. Pat. No. 4,006,713 to Hawley, III discloses a further typical collapsible dog house comprising two opposed side walls, a front wall, a rear wall, a floor and roof which are separable components, the side walls are notched and grooved to fit the skirts of the floor and roof and also to fit the front and rear walls. However, similarly, it will be complicated to manufacture and assemble the side walls and the front and rear walls and the floor wall and the roof member together, and it will be difficult to engage notches and grooves with the skirts of the floor and roof and to fit the front and rear walls, such that the manufacturing and assembling time may be greatly increased.

U.S. Pat. No. 4,256,056 to Sou discloses a still further typical portable case for carrying small animal comprising two opposed side boards, a top board connected at its left and right sides to the respective upper end faces of the left and right side wall boards through the aid of hinged joints, and a bottom board connected to the side wall boards. However, similarly, it will be complicated to manufacture and assemble the side wall boards and the front and rear wall boards and the floor wall board and the roof board member together, and it will be difficult to engage hinged joints into and through the wall members, such that the manufacturing and assembling time may be greatly increased.

U.S. Pat. No. 4,334,501 to McDaniel et al. discloses a still further typical animal shelter and feed dispenser comprising two opposed side boards, a top board connected to the left and right side wall boards, and a bottom board connected to the side wall boards with post members and clip elements. However, similarly, it will be complicated to manufacture and assemble the side wall boards and the front and rear wall boards and the floor wall board and the roof board member together, and it will be difficult to engage post members and clip elements with the wall members, such that the manufacturing and assembling time may be greatly increased.

U.S. Pat. No. 4,803,952 to Houser discloses a still further typical portable shelter for carrying small animal comprising a body portion foldable to a rectangular and spatial or three-dimensional structure, a base assembly, a first story assembly, an intermediate assembly, a rear wall assembly, a front wall assembly, and a roof assembly. However, similarly, it will be complicated to manufacture and assemble the body portion, the base assembly, the first story assembly, the intermediate assembly, the rear wall assembly, the front wall assembly, and the roof assembly together, such that the manufacturing and assembling time for the typical portable shelter may be greatly increased.

The closest prior art references of which the applicant is aware were disclosed in U.S. Pat. No. 5,967,090 to Hui, U.S. Publication No. 2008/0121188 to Axelrod et al., U.S. Publication No. 2003/0127060 to Yeung, and U.S. Publication No. 2004/0134444 to Shiever et al.

BRIEF SUMMARY OF THE INVENTION

The primary objective of the present invention is to provide a foldable and portable shelter whose periphery has a reinforced structural strength.

In accordance with the present invention, there is provided a shelter, comprising a base member and an upper member combined with the base member. The base member includes a bottom wall panel, a rear wall panel pivotally coupled to the bottom wall panel, and a front wall panel pivotally coupled to the bottom wall panel. Each of the rear wall panel and the front wall panel of the base member has a periphery provided with a plurality of first reinforcing ribs for reinforcing purposes. Each of the first reinforcing ribs of the base member has an arcuate concave surface. The upper member includes a top wall panel and two opposed side wall panels each pivotally coupled to the top wall panel. Each of the top wall panel and the side wall panels of the upper member has a periphery provided with a plurality of second reinforcing ribs for reinforcing purposes. Each of the second reinforcing ribs of the upper member has an arcuate concave surface. Each of the second reinforcing ribs of the upper member overlaps a respective one of the first reinforcing ribs of the base member when the upper member and the base member are combined together so that the second reinforcing ribs of the upper member cooperate with the first reinforcing ribs of the base member to reinforce the strength of the upper member and the base member and the strength of the shelter.

Each of the first reinforcing ribs of the base member is inclined to the rear wall panel and the front wall panel, with an inclined angle of about forty-five degrees (45°) being defined between each of the first reinforcing ribs and each of the rear wall panel and the front wall panel. Each of the second reinforcing ribs of the upper member is inclined to the top wall panel and the side wall panels, with an inclined angle of about forty-five degrees (45°) being defined between each of the second reinforcing ribs and each of the top wall panel and the side wall panels.

Each of the first reinforcing ribs of the base member is formed on the top and two opposite ends of each of the rear wall panel and the front wall panel. Each of the second reinforcing ribs of the upper member is formed on two opposite ends of each of the top wall panel and the side wall panels.

Each of the first reinforcing ribs of the base member has a leaf shape. Each of the second reinforcing ribs of the upper member has a leaf shape.

Each of the first reinforcing ribs of the base member extends and protrudes outward from each of the rear wall panel and the front wall panel. Each of the second reinforcing ribs of the upper member extends and protrudes outward from each of the top wall panel and the side wall panels.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 11:
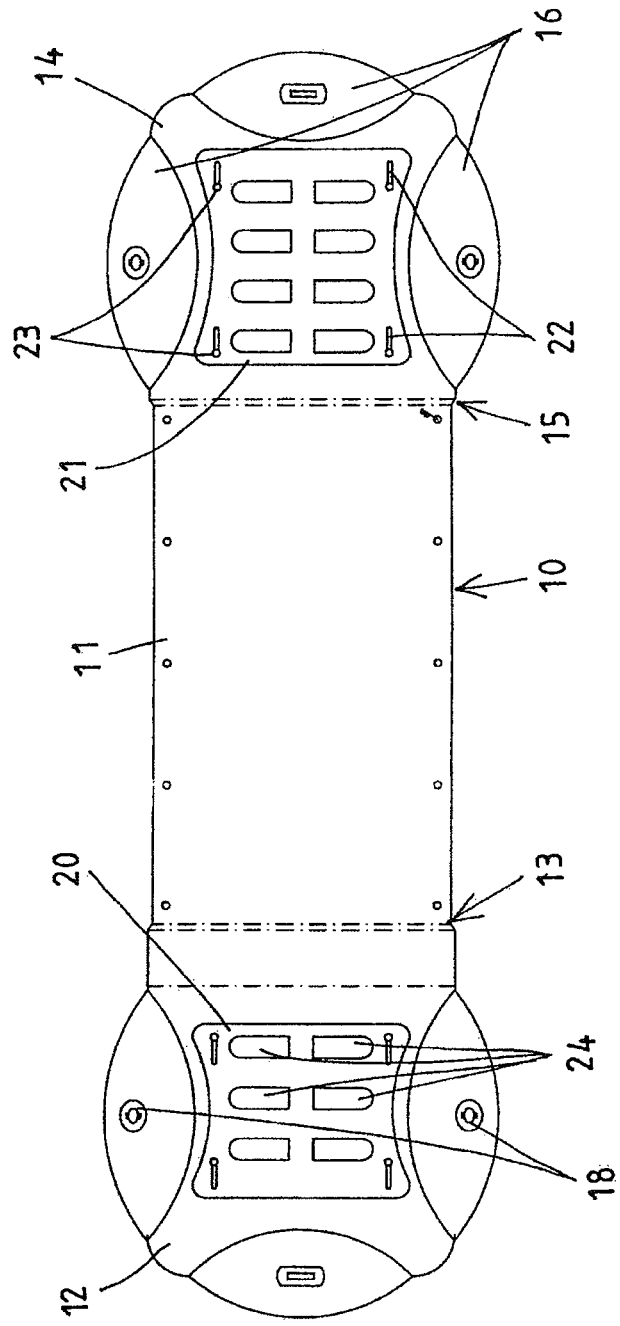
FIG. 11 is another plan schematic view illustrating the other member of the foldable and portable shelter.
Figure 12:
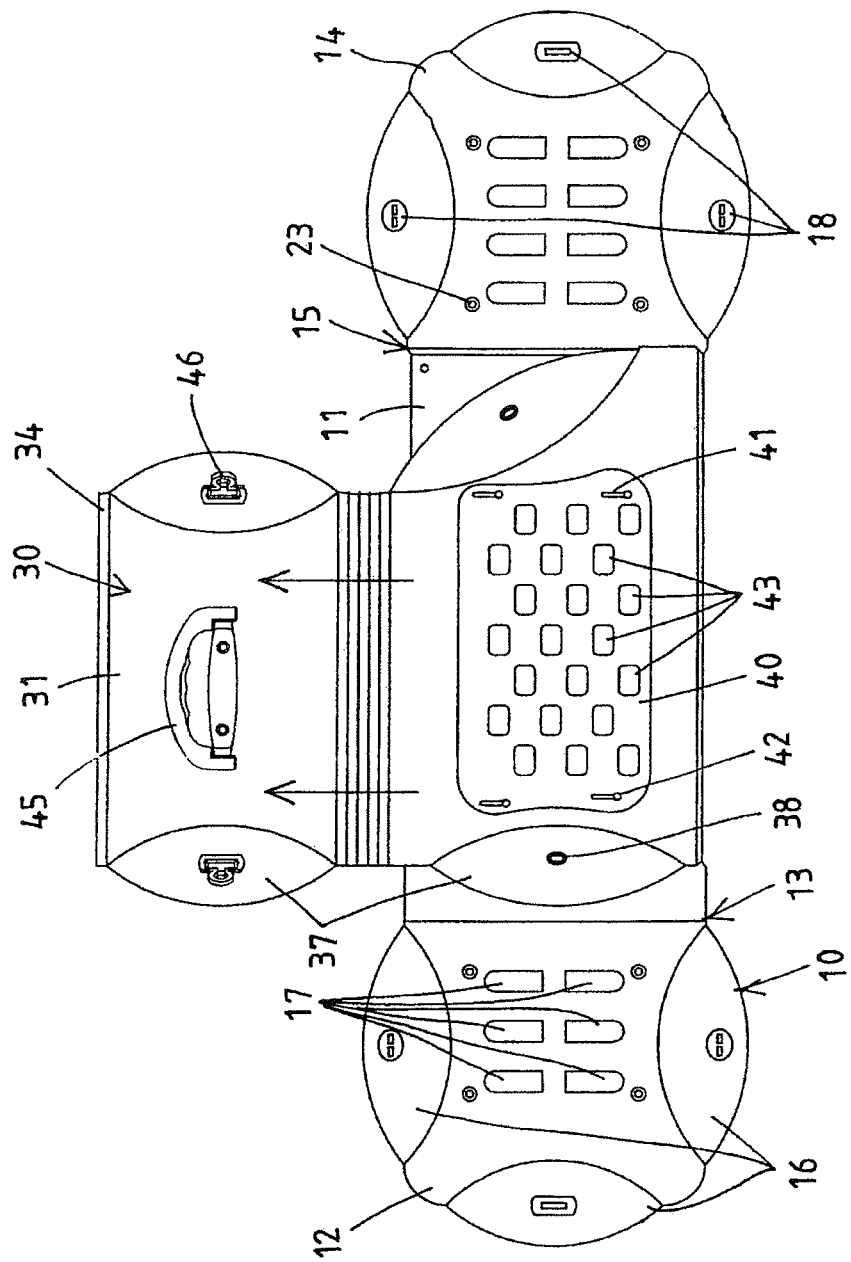
FIGS. 12 and 13 are further plan schematic views illustrating the folding operation of the foldable and portable shelter.

Referring to the drawings, and initially to FIGS. 1-9, a foldable and portable shelter 1 in accordance with the present invention comprises a base member 10 including a bottom wall panel 11, a rear wall panel 12 pivotally or foldably coupled to the bottom wall panel 11 with a hinge line or folding line 13, and a front wall panel 14 pivotally or foldably coupled to the bottom wall panel 11 with another hinge line or folding line 15. The rear wall panel 12 and the front wall panel 14 are foldable and pivotal relative to the bottom wall panel 11 to reach a U-shaped working position as shown in FIGS. 1-4 and 7-9, or to reach a planar unfolded or storing position as shown in FIGS. 11-12.

Each of the rear wall panel 12 and the front wall panel 14 of the base member 10 has a periphery provided with a plurality of first reinforcing ribs 16 for reinforcing purposes. Preferably, each of the first reinforcing ribs 16 of the base member 10 is formed on the top and two opposite ends of each of the rear wall panel 12 and the front wall panel 14. Each of the first reinforcing ribs 16 of the base member 10 extends and protrudes outward from each of the rear wall panel 12 and the front wall panel 14. Each of the first reinforcing ribs 16 of the base member 10 has an arcuate concave surface with a leaf shape. Each of the first reinforcing ribs 16 of the base member 10 is inclined to the rear wall panel 12 and the front wall panel 14, with an inclined angle of about forty-five degrees (45°) being defined between each of the first reinforcing ribs 16 and each of the rear wall panel 12 and the front wall panel 14.

Each of the rear wall panel 12 and the front wall panel 14 includes a number of openings 17 formed therein (FIGS. 3, 5, 8, 12) for air circulation or ventilation purposes. Each of the rear wall panel 12 and the front wall panel 14 includes one or more (such as three) latch members 18, such as female latch members 18 formed or provided therein, particularly formed on the first reinforcing ribs 16 respectively. A cushion or pad 19 is disposed or attached or mounted on the bottom wall panel 11 and may be easily removed and cleaned for suitably and comfortably supporting the small animal therein.

Two window plates 20, 21 each include one or more (such as four) slots 22 formed therein, and one or more (such as four) rivets or fasteners 23 are engaged through the slots 22 of the window plates 20, 21 and are mounted or secured to the rear wall panel 12 and the front wall panel 14 respectively for slidably attaching or mounting or securing or coupling the window plates 20, 21 to the rear wall panel 12 and the front wall panel 14 respectively. Each of the window plates 20, 21 includes a number of orifices 24 formed therein for selectively aligning with the openings 17 of the rear wall panel 12 and the front wall panel 14 respectively (FIGS. 1, 2) and for air circulation or ventilation purposes, or for selectively offset the openings 17 of the rear wall panel 12 and the front wall panel 14 (FIGS. 6, 8) and for selectively blocking or sealing the openings 17 of the rear wall panel 12 and the front wall panel 14 respectively.

Figure 1:
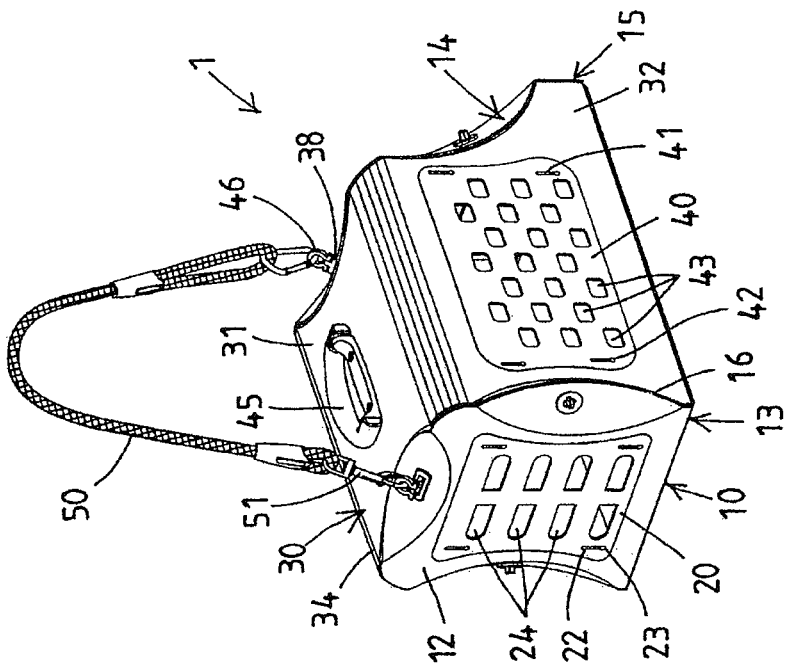
FIG. 1 is a front perspective view of a foldable and portable shelter in accordance with the present invention.
Figure 2:
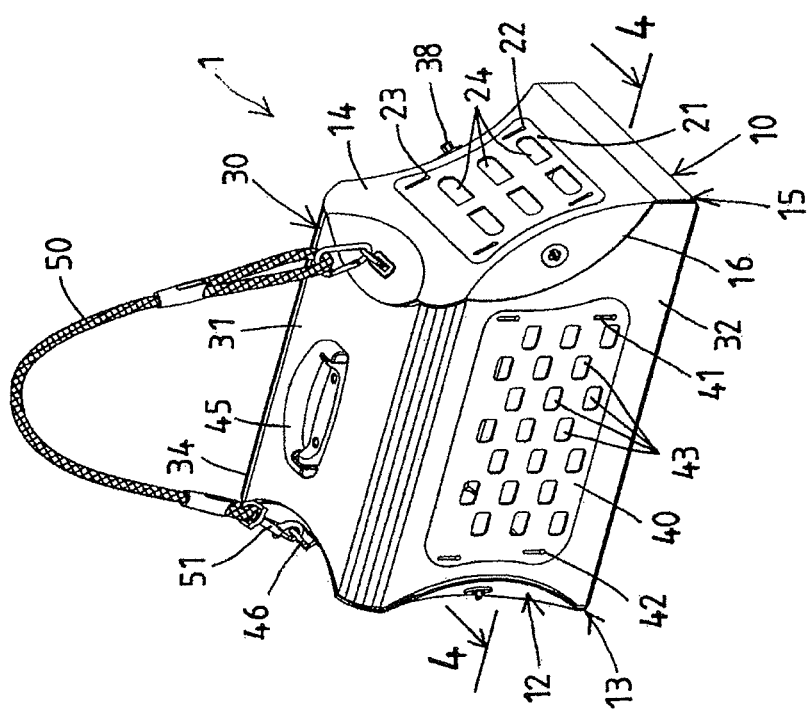
FIG. 2 is a rear perspective view of the foldable and portable shelter.
Figure 3:
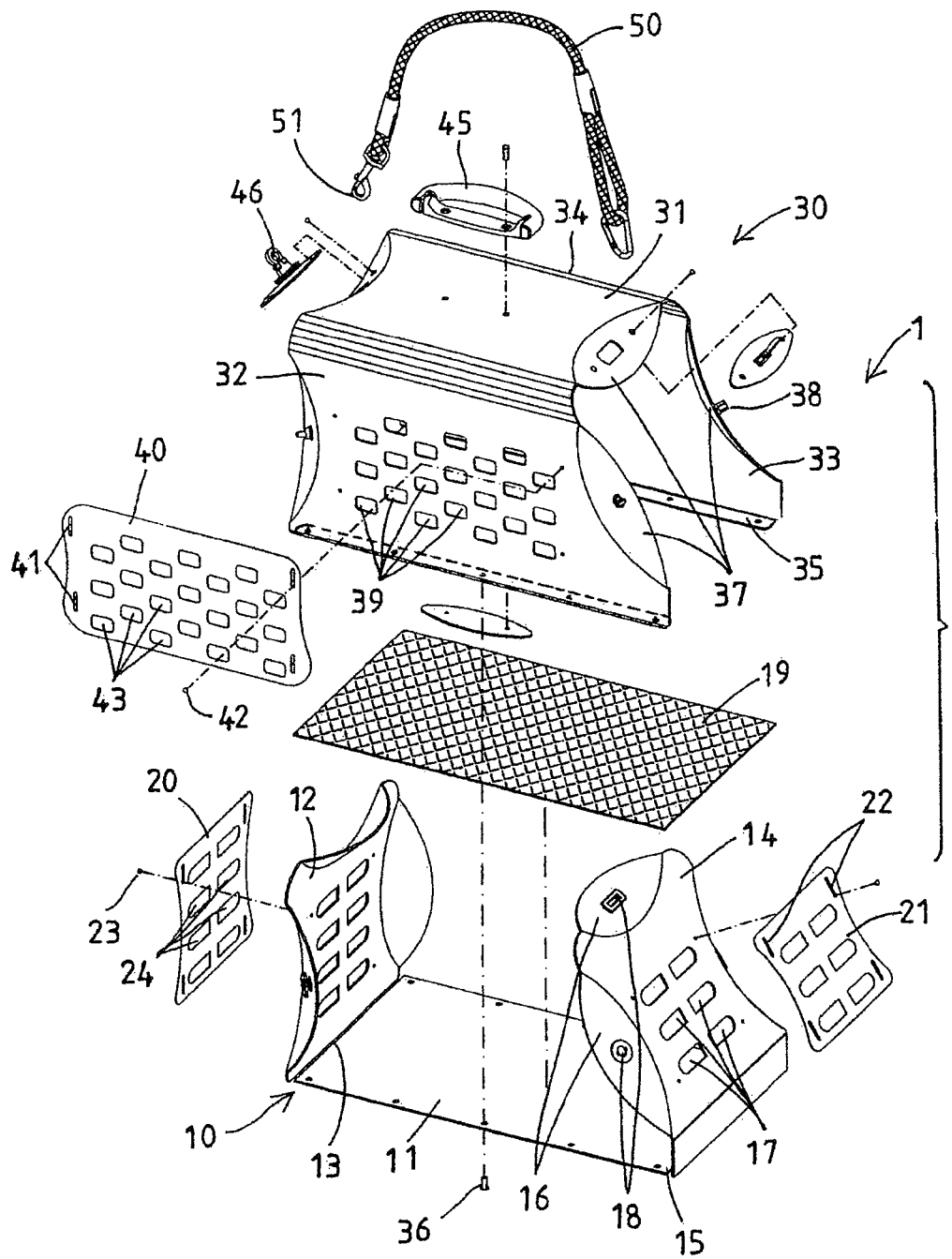
FIG. 3 is a partial exploded view of the foldable and portable shelter.
Figure 5:
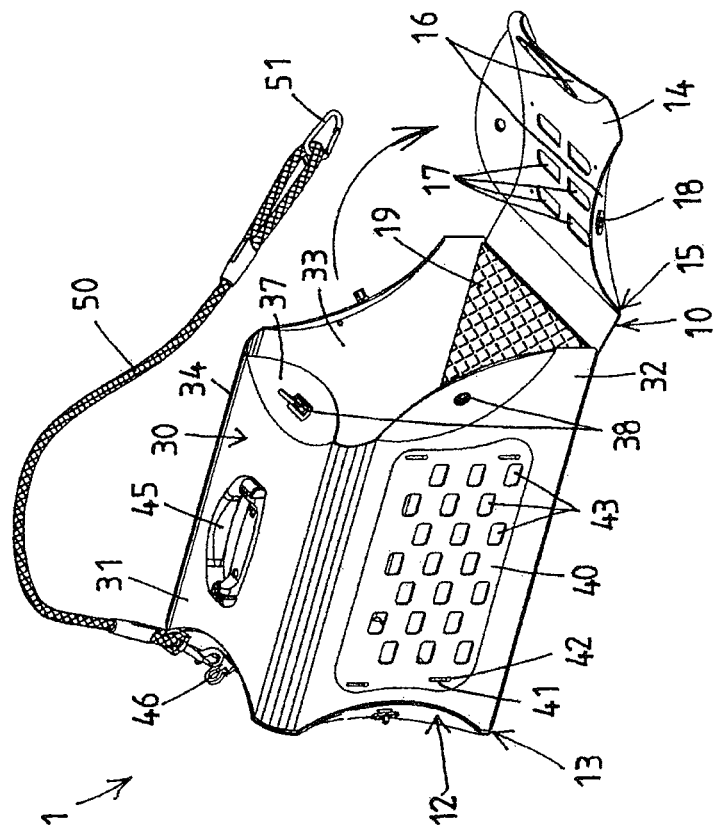
FIG. 5 is a front perspective view similar to FIG. 1, illustrating the operation of the foldable and portable shelter.
Figure 4:
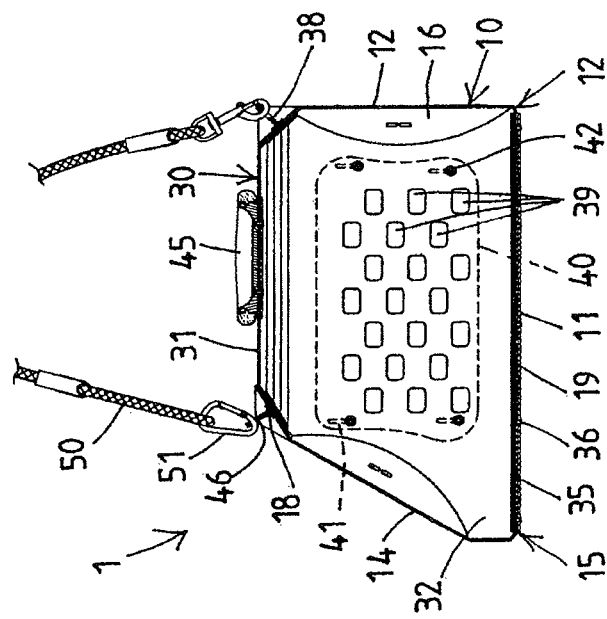
FIG. 4 is a partial cross sectional view of the foldable and portable shelter taken along lines 4-4 of FIG. 1.
Figure 7:
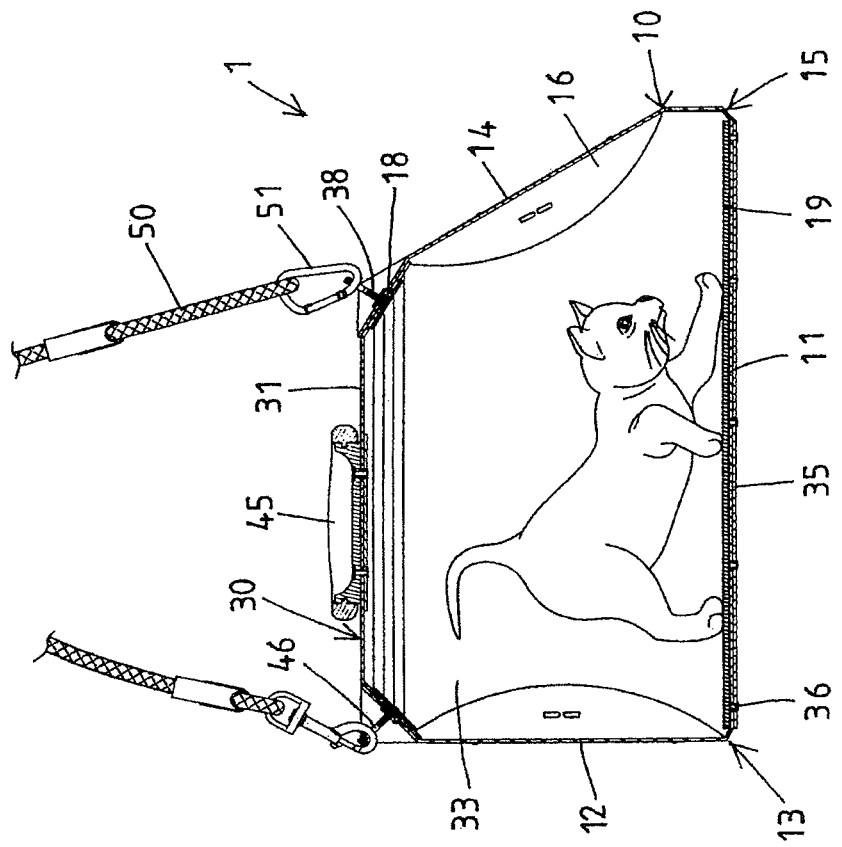
FIG. 7 is a partial cross sectional view illustrating the operation of the foldable and portable shelter.
Figure 6:
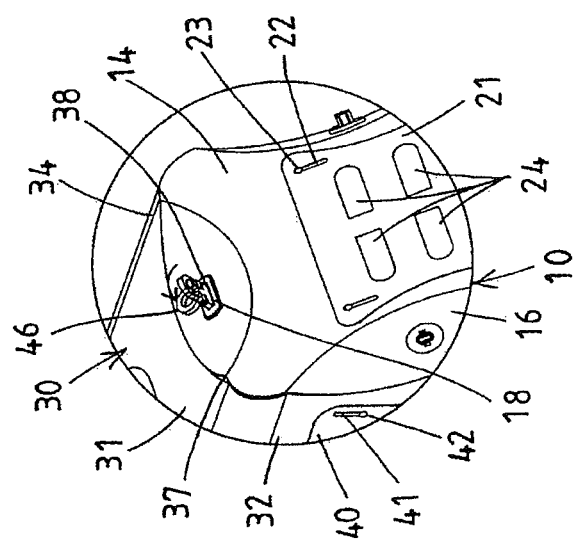
FIG. 6 is an enlarged partial perspective view illustrating the operation of the foldable and portable shelter.
Figure 8:
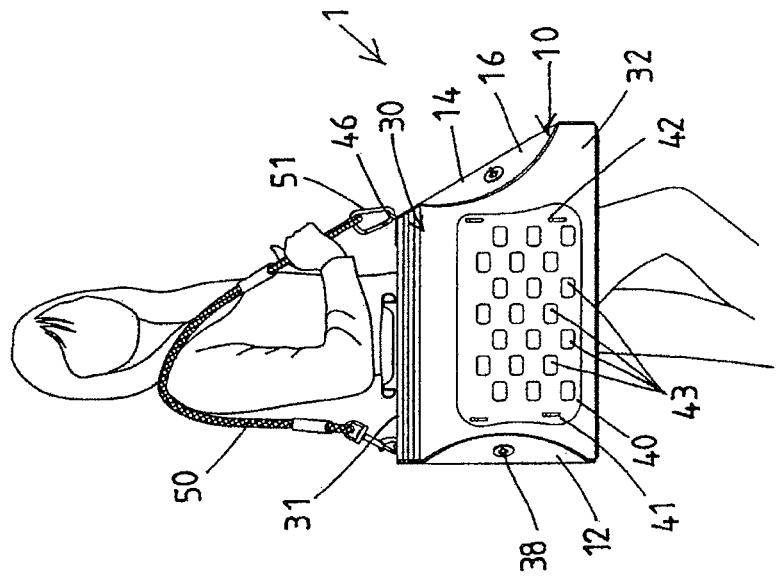
FIG. 8 is a partial front perspective view illustrating the operation of the foldable and portable shelter.
Figure 9:
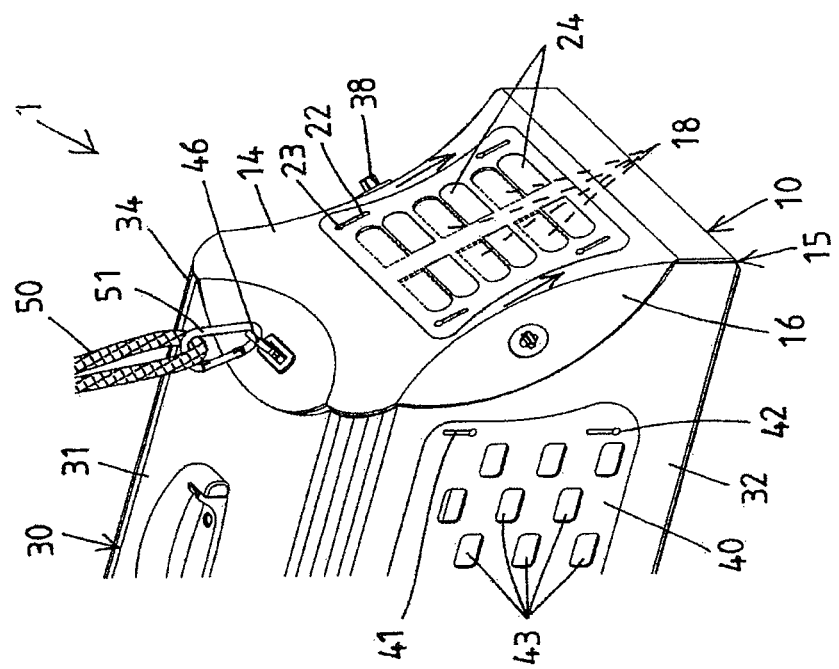
FIG. 9 is a plan schematic view illustrating the operation of the foldable and portable shelter.
Figure 10:
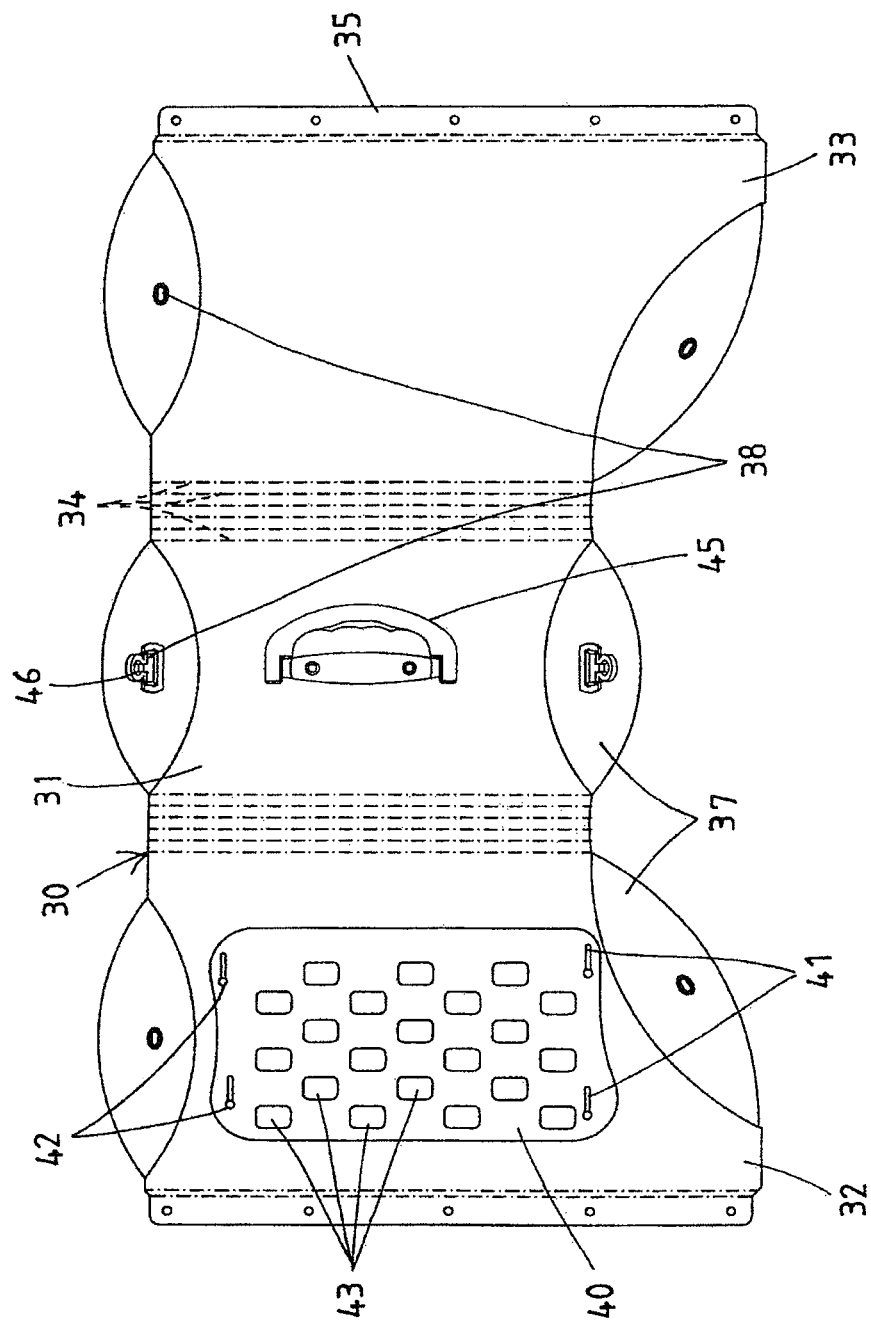
FIG. 10 is a plan schematic view illustrating one of the members of the foldable and portable shelter.

The portable shelter 1 further comprises an upper member 30 combined with the base member 10. The upper member 30 includes a top wall panel 31 and two opposed side wall panels 32, 33 each pivotally or foldably coupled to the top wall panel 31 with a curved or rounded portion or hinge line or folding line 34, and foldable and pivotal relative to the top wall panel 31 to reach a U-shaped working position as shown in FIGS. 1-9, or to reach a planar unfolded or storing position as shown in FIG. 10. Each of the side wall panels 32, 33 includes a flange 35 folded or extended laterally and inwardly from the bottom portion thereof (FIGS. 3, 4, 7, 10) for engaging with the bottom wall panel 11 of the base member 10 and for securing to the bottom wall panel 11 of the base member 10 with rivets or fasteners 36 (FIGS. 3, 4, 7).

Each of the top wall panel 31 and the side wall panels 32, 33 of the upper member 30 has a periphery provided with a plurality of second reinforcing ribs 37 for reinforcing purposes. Preferably, each of the second reinforcing ribs 37 of the upper member 30 is formed on two opposite ends of each of the top wall panel 31 and the side wall panels 32, 33. Each of the second reinforcing ribs 37 of the upper member 30 extends and protrudes outward from each of the top wall panel 31 and the side wall panels 32, 33. Each of the second reinforcing ribs 37 of the upper member 30 overlaps a respective one of the first reinforcing ribs 16 of the base member 10 when the upper member 30 and the base member 10 are combined together so that the second reinforcing ribs 37 of the upper member 30 cooperate with the first reinforcing ribs 16 of the base member 10 to reinforce the strength of the upper member 30 and the base member 10. Each of the second reinforcing ribs 37 of the upper member 30 has an arcuate concave surface with a leaf shape. Each of the second reinforcing ribs 37 of the upper member 30 is inclined to the top wall panel 31 and the side wall panels 32, 33, with an inclined angle of about forty-five degrees (45°) being defined between each of the second reinforcing ribs 37 and each of the top wall panel 31 and the side wall panels 32, 33.

The top wall panel 31 and the side wall panels 32, 33 each include one or more (such as two) latch members 38, such as male latch members 38 formed or provided thereon, particularly formed on the second reinforcing ribs 37 respectively for engaging with the female latch members 18 of the base member 10 respectively, and for selectively locking or latching the rear wall panel 12 and the front wall panel 14 to the top wall panel 31 and the side wall panels 32, 33 of the upper member 30, and for stably receiving the small animal or pet in the portable shelter 1.

One or both of the side wall panels 32, 33 each include a number of openings 39 formed therein (FIGS. 3, 4) for air circulation or ventilation purposes. A window plate 40 includes one or more (such as four) slots 41 formed therein, and one or more (such as four) rivets or fasteners 42 are engaged through the slots 41 of the window plate 40 and mounted or secured to the side wall panel 32 for slidably attaching or mounting or securing or coupling the window plate 40 to the side wall panel 32. The window plate 40 includes a number of apertures 43 formed therein for selectively aligning with the openings 39 of the side wall panel 32 (FIGS. 1, 2) and for air circulation or ventilation purposes, or for selectively offset the openings 39 of the side wall panel 32 and for selectively blocking or sealing the openings 39 of the side wall panel 32.

The portable shelter 1 further includes a hand grip 45 formed or provided on the top wall panel 31 of the upper member 30 for allowing the shelter 1 to be easily carried with the user, and further includes two rings or loops 46 attached to the latch members 38 of the top wall panel 31 of the upper member 30. A carrying belt or strap 50 includes two end clips or locks or fasteners or couplers 51 for selectively engaging with the loops 46 and for detachably attaching or mounting or securing or coupling the strap 50 to the shelter 1 and for allowing the shelter 1 to be easily carried with the user (FIG. 9).

In operation, as shown in FIGS. 10-13, when the upper member 30 and the base member 10 are separated or disengaged from each other, the upper member 30 and the base member 10 may be superposed with each other and may be folded to a compact folding or receiving structure for storing and transportation purposes, and the upper member 30 may be easily and quickly attached or mounted or secured to the base member 10 to form a rectangular and spatial or three-dimensional structure for suitably and comfortably supporting the small animal or pet therein.

Figure 14:
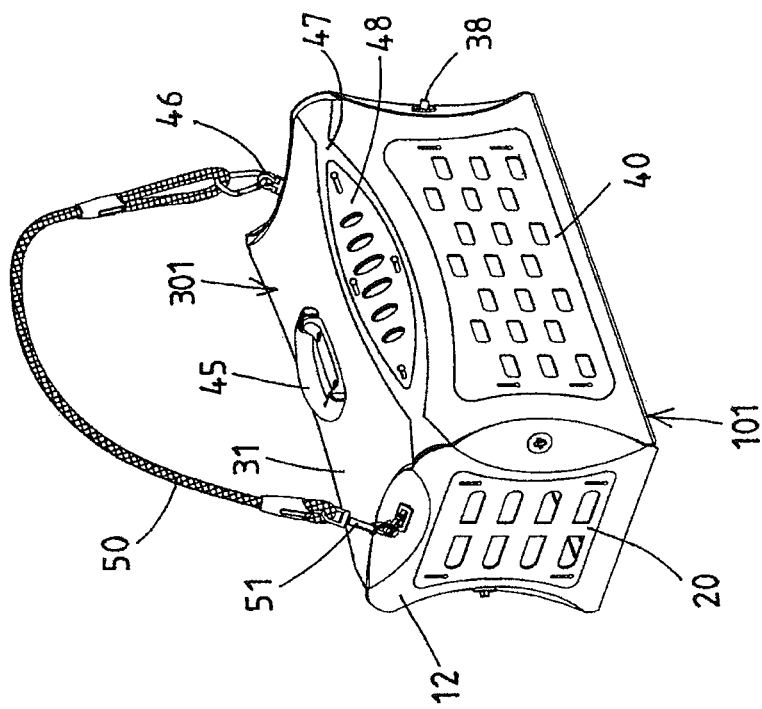
FIG. 14 is a perspective view illustrating the other arrangement of the foldable and portable shelter.
Figure 13:
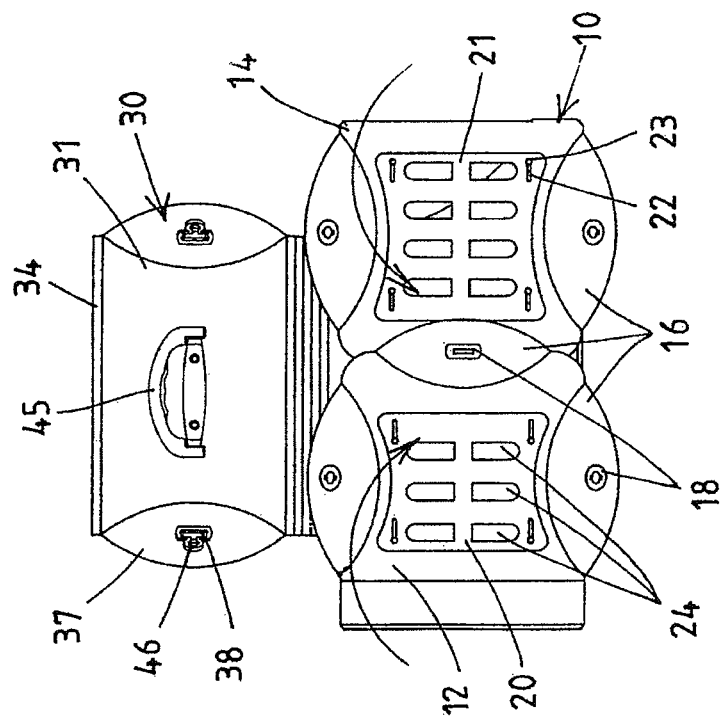

Alternatively, as shown in FIG. 14, the upper member 301 and the base member 101 may be formed or shaped to different shapes or configurations or contours, and the upper member 301 may include two or more folded or wrinkled or curved reinforcing ribs 47 formed or provided on the outer peripheral portion thereof and curved relative to the top wall panel 31 for reinforcing purposes, and may include a further window plate 48 for air circulation or ventilation purposes, or for selectively blocking or sealing the air circulation or ventilation openings of the top wall panel 31 or of the upper member 301.

Accordingly, each of the second reinforcing ribs 37 of the upper member 30 overlaps a respective one of the first reinforcing ribs 16 of the base member 10 when the upper member 30 and the base member 10 are combined together so that the second reinforcing ribs 37 of the upper member 30 cooperate with the first reinforcing ribs 16 of the base member 10 to reinforce the strength of the upper member 30 and the base member 10 and to prevent the portable shelter 1 from being distorted or deformed due to an external force or impact. In addition, the portable shelter 1 has multiple reinforcing ribs with leaf shapes so that the portable shelter 1 has an outstanding appearance.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A shelter, comprising:
a base member; and
an upper member combined with the base member; wherein:
the base member includes a bottom wall panel, a rear wall panel pivotally coupled to the bottom wall panel, and a front wall panel pivotally coupled to the bottom wall panel;
each of the rear wall panel and the front wall panel of the base member has a periphery provided with a plurality of first reinforcing ribs for reinforcing purposes;
each of the first reinforcing ribs of the base member has an arcuate concave surface;
the upper member includes a top wall panel and two opposed side wall panels each pivotally coupled to the top wall panel;
each of the top wall panel and the side wall panels of the upper member has a periphery provided with a plurality of second reinforcing ribs for reinforcing purposes;
each of the second reinforcing ribs of the upper member has an arcuate concave surface;
each of the second reinforcing ribs of the upper member overlaps a respective one of the first reinforcing ribs of the base member when the upper member and the base member are combined together;
the second reinforcing ribs of the upper member cooperate with the first reinforcing ribs of the base member to reinforce the strength of the upper member and the base member and the strength of the shelter; each of the first reinforcing ribs of the base member is inclined to the rear wall panel and the front wall panel, with an inclined angle of about forty-five degrees (45°) being defined between each of the first reinforcing ribs and each of the rear wall panel and the front wall panel; and each of the second reinforcing ribs of the upper member is inclined to the top wall panel and the side wall panels, with an inclined angle of about forty-five degrees (45°) being defined between each of the second reinforcing ribs and each of the top wall panel and the side wall panels.

2. The shelter of claim 1, wherein:
each of the first reinforcing ribs of the base member is formed on a top and two opposite ends of each of the rear wall panel and the front wall panel; and
each of the second reinforcing ribs of the upper member is formed on two opposite ends of each of the top wall panel and the side wall panels.

3. The shelter of claim 1, wherein:
each of the first reinforcing ribs of the base member has a leaf shape; and each of the second reinforcing ribs of the upper member has a leaf shape.

4. The shelter of claim 1, wherein:

each of the first reinforcing ribs of the base member extends and protrudes outward from each of the rear wall panel and the front wall panel; and each of the second reinforcing ribs of the upper member extends and protrudes outward from each of the top wall panel and the side wall panels.

* * * * *